May 22, 1951 — T. J. R. BRIGHT — 2,554,452
WEATHER STRIP
Filed Feb. 3, 1949 — 3 Sheets-Sheet 1
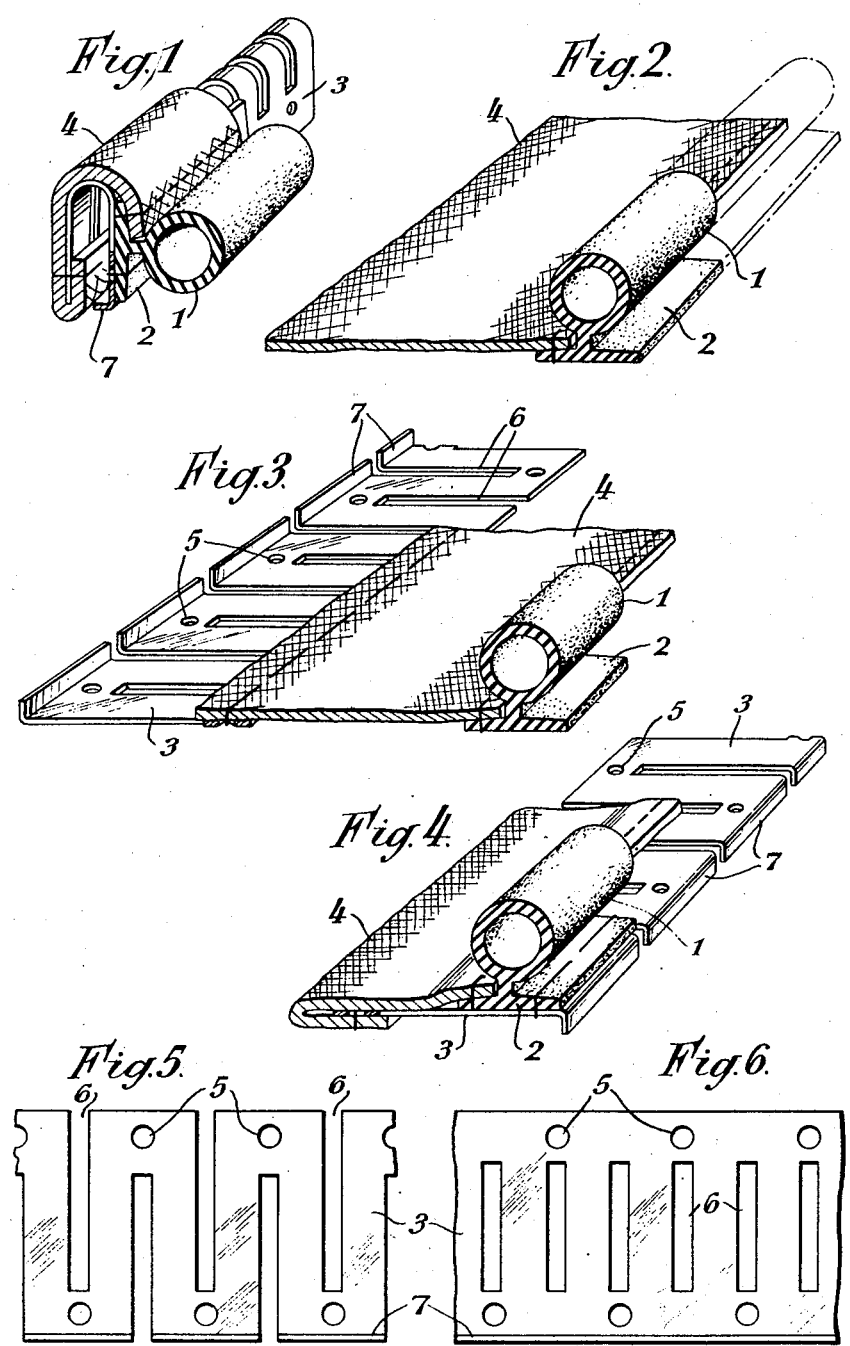
INVENTOR
Thomas John Robert Bright
BY Stevens Davis Miller & Mosher
his ATTORNEYS May 22, 1951      T. J. R. BRIGHT      2,554,452
WEATHER STRIP
Filed Feb. 3, 1949      3 Sheets-Sheet 2
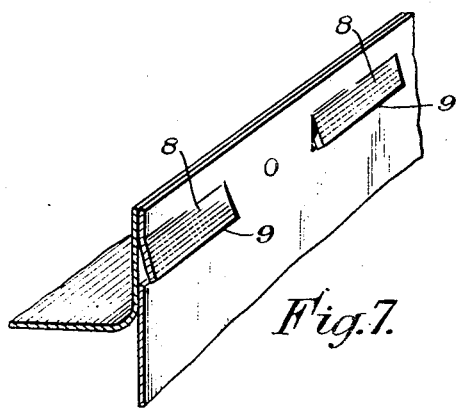
Fig.7.
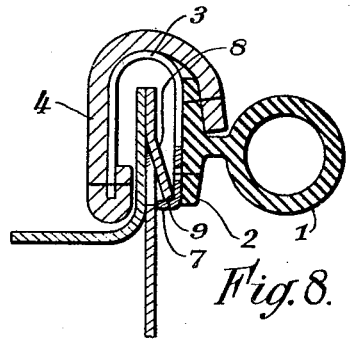
Fig.8.
Fig.9.
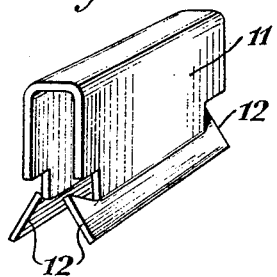
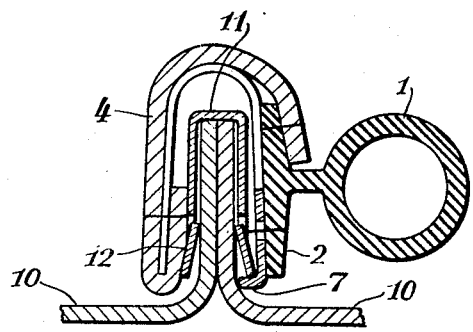
Fig.10.
Fig.11.
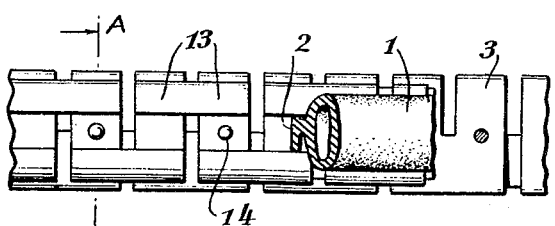
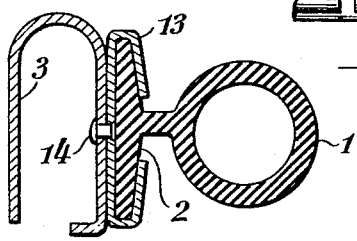
Fig.12.
INVENTOR
Thomas John Robert Bright
BY Stevens, Davis, Miller + Mosher
his ATTORNEYS May 22, 1951  T. J. R. BRIGHT  2,554,452
WEATHER STRIP
Filed Feb. 3, 1949  3 Sheets-Sheet 3
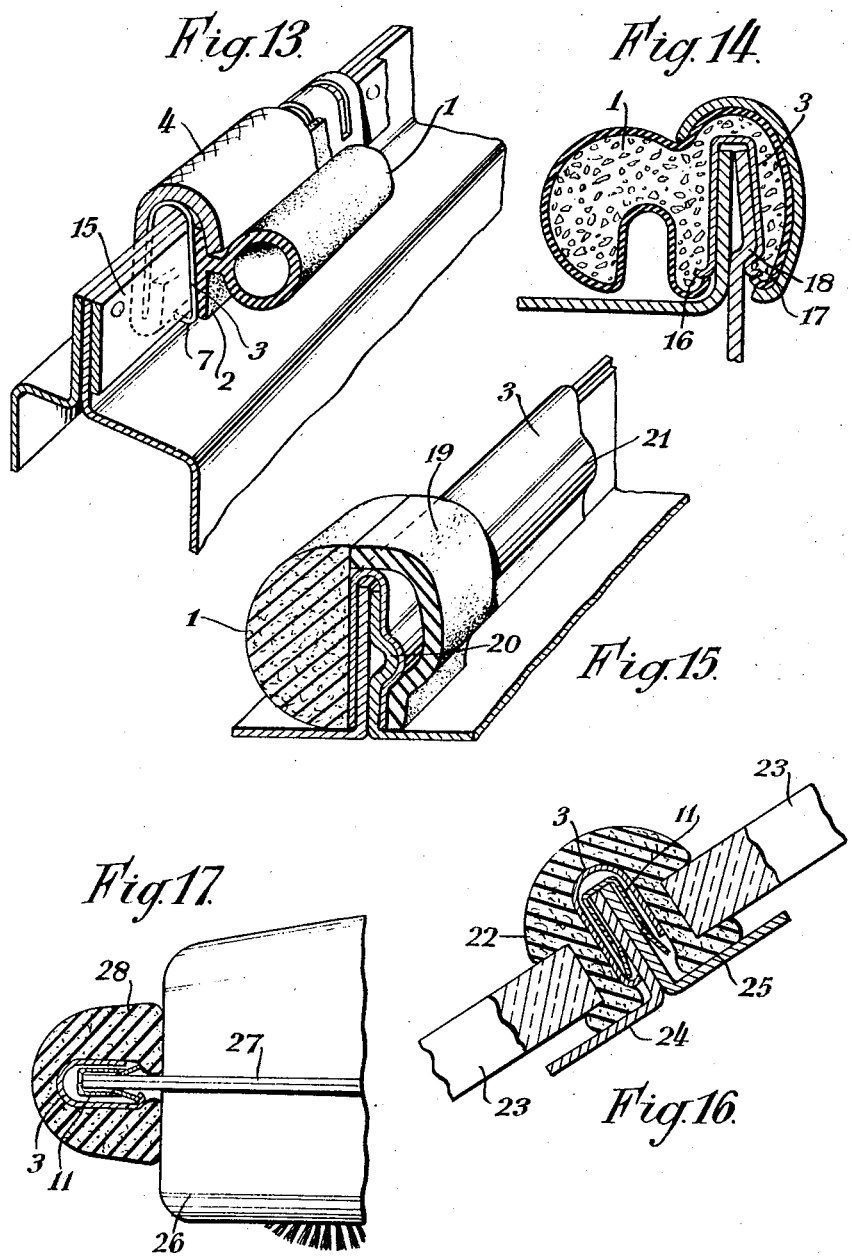

Patented May 22, 1951

2,554,452

UNITED STATES PATENT OFFICE 2,554,452

WEATHER STRIP

Thomas John Robert Bright, Millison Wood, near Allesley, Coventry, England

Application February 3, 1949, Serial No. 74,344
In Great Britain January 30, 1948

6 Claims. (Cl. 20—69)

One of the objects of the present invention is to evolve an improved method of securing draught excluding or sealing strips, beadings, mouldings and the like in position. Such components hereinafter referred to as strips are employed where it is desired to exclude draughts and generally provide a good sealing between two components or in certain cases where it is desired to provide a moulding or beading which, whilst having an ornamental appearance will also act as a buffer or cushion.

Such strips when used for draught excluding or sealing purposes may be used in conjunction with the doors of motor road vehicles or other closure members and may be applied either directly or indirectly to a supporting flange or equivalent part which may form a part of the vehicle body or alternatively the door or other closure member, such strips including an effective portion which is compressed under the closing action of the door or like closure member to provide a good seal and an attachment portion by means of which the effective portion is secured to the flange or equivalent part. It will be appreciated that from the manufacturing point of view it is very desirable that such strips shall be capable of being quickly secured in position upon their supporting flanges or equivalent parts and that once in position there shall be no risk of accidental detachment of the strip when the vehicle is in use. The method according to the present invention of securing such strips in position has therefore been devised to facilitate attachment of the strip and to ensure the strip being secured firmly in position when it has once been applied.

Although it is preferred that the flange or equivalent part which is to receive the strip shall be so constructed as to assist in retaining the strip in position, it is within the scope of the invention to provide means for association with the flange for the express purpose of enabling the strip to be applied to flanges of orthodox form, the strip being capable therefore of application to existing vehicle bodies in substitution for the strip at present in use.

A further object of the invention is to evolve an improved method of manufacturing the strip in quantities.

A further object of the invention which is concerned with the application of the invention to household articles, or alternatively to greenhouses, is to provide a beading or moulding which, whilst having an ornamental appearance will in the case of its application to household articles provide an efficient buffer or cushion, and in the case of its application to greenhouses will serve to secure the sheets of glass or lights in position on the supporting frame and to provide an efficient seal which will not only prevent the ingress of moisture to the greenhouse, but will also prevent the escape of warm air therefrom, thereby economising in fuel used for maintaining the greenhouse at the required temperature.

Although in certain cases the strip according to the invention will be applied in its initial straight form, in the case of the application of the strip to motor road vehicles it is often necessary for the strip to circumvent curves of quite a small radius and a still further object of the invention, therefore, is to evolve a construction of strip which, whilst initially of straight formation can nevertheless be easily bent to the desired degree of curvature without tendency for the strip and particularly the effective portion of the strip to kink and thus have an unsightly appearance and/or impair the efficiency of the seal.

In order that the invention may be clearly understood and readily carried into effect the invention is hereinafter described with reference to the accompanying drawings in which:

Figure 1 is a fragmentary perspective view of one form of draught excluding or sealing strip in accordance with the invention.

Figures 2, 3 and 4 illustrate the strip in process of manufacture.

Figure 5 is a plan view of the metal supporting clip forming a part thereof.

Figure 6 is a similar view illustrating a modified construction of supporting clip.

Figure 7 is a fragmentary perspective view illustrating a suggested modification to the supporting flange.

Figure 8 is a sectional view showing the strip illustrated in Figure 1 applied to a flange as shown in Figure 7.

Figure 9 is a perspective view of a spring clip intended for use with a flange of orthodox construction.

Figure 10 is a sectional view illustrating this use.

Figure 11 is a section on an enlarged scale on the line A—B in Figure 12 of a modified form of draught excluding strip.

Figure 12 is fragmentary plan view of the same.

Figure 13 is a fragmentary perspective view showing the application of a modified strip to an alternative form of supporting flange.

Figure 14 is a section showing a further form of strip applied to a still further modified flange.

Figure 15 is a fragmentary perspective view illustrating a still further construction.

Figure 16 is a section showing the application of the invention to a sealing strip for greenhouses.

Figure 17 is a section showing diagrammatically an application of an alternative form of beading or moulding applied to a domestic article such as a carpet sweeper or vacuum cleaner.

Referring in the first case to the construction illustrated by Figures 1 to 5, which illustrate a preferred embodiment of the invention, the draught excluding or sealing strip comprises an effective portion including a tubular part 1 which when applied, for example, to a motor road vehicle is compressed under the closing action of the door or other closure member to provide an effective seal, the part 1 being formed integrally with a flange 2, the component being preferably produced from rubber or other suitable resilient material by an extruding or moulding operation For the purpose of securely mounting the effective part 1 and 2 in position upon a supporting flange or equivalent member, the strip includes a metal clip-like component 3 which is stamped or pressed out as shown clearly in Figure 5 and is subsequently bent to the inverted channel shape form shown in Figure 1. As the clip 3 would normally be visible from the interior of a vehicle it is proposed that it shall be covered by a suitable fabric strip 4 having an ornamental appearance and Figures 2, 3 and 4 illustrate the preferred method of securing the components together.

It is proposed to sew the components together and as shown in Figure 2 the fabric strip 4 is first of all stitched to the flange 2 of the tubular member 1. The opposite edge of the fabric strip 4 is then stitched to the supporting clip 3 and to facilitate the stitching operation the strip 3 is formed with a series of spaced holes 5 through which the needle of the sewing machine passes, the needle also passing through transversely arranged slots 6 in the strip which are provided for a purpose hereinafter referred to. The sewing machine is so adapted that downward movement of the needle will only take place when a hole or slot is directly beneath the needle point, the edges of the slots being used to position the strip correctly with respect to the needle. In this way stitching of the ornamental fabric strip 4 and also the rubber or like effective portion 1 and 2 to the metal strip is effected satisfactorily without risk of the needle being broken as a result of its accidental contact with the metal strip.

In Figure 4 the fabric strip 4 has been turned over the edge of the metal strip and the opposite edge of the flange 2 to that which was used for the attachment of the strip 4 has been stitched to the metal strip, the needle as before passing through the holes and slots which are formed in the metal strip.

The metal strip 3 is still in substantially flat form and it is now necessary to bend this strip to the inverted channel shape section illustrated in Figure 1. This may be effected in any suitable manner the action of bending the strip 3 tensioning the ornamental fabric strip 4 and ensuring it having a flush flat appearance.

Although sewing may be relied on to maintain effective connection between the component parts, it is nevertheless within the scope of the invention to employ in addition a suitable adhesive which can be applied to the back of the ornamental fabric strip, to the flange on the effective portion, or alternatively to the metal strip or to any or all of these components for the purpose of giving increased security of connection between the parts.

The staggered slots 6 illustrated clearly in Figure 5 are provided to enable the channel shaped supporting clip 3 to be bent easily around curves of quite small radius in a plane parallel to the limbs of the clip 3, this being often necessary in the case of the application of the strip to a flange on a motor vehicle body.

An alternative form of supporting clip is shown in Figure 6 in which the slots 6 do not actually extend to the edge of the strip, but extend transversely thereof throughout the greater part of the strip's width.

The strip is initially formed with an inwardly directed peripheral edge 7 which is provided for a purpose hereinafter referred to as illustrated more particularly in Figure 8 of the accompanying drawings.

Referring now to Figure 7 which illustrates a supporting flange of a vehicle body modified to accommodate the strip illustrated by Figures 1 and 8, it will be seen that the flange is formed with pressed out tangs 8 which are suitably spaced apart throughout the length of the flange and in addition to providing a lead to facilitate the placing of the strip in position, provide a shoulder 9 over which the inwardly turned edge 7 of the supporting clip can ride and thus prevent accidental detachment of the strip when once it is in position on the supporting flange. Although it is preferred that the supporting flange shall be produced in a manner such as, for example, that shown in Figure 7 it may in certain cases be desired to apply the strip to an existing flange which is not so formed as to provide a shoulder or a series of shoulders over which the inwardly directed edge 7 can ride, and Figures 9 and 10 illustrate the steps taken in such a contingency.

In Figure 10 the flange as in the case of Figure 7 includes two metal components 10 which are spot welded or otherwise permanently secured together to provide a flange of double thickness, this being the usual method of vehicle body construction. It is proposed in such a case to utilise a series of spring clips 11 of inverted channel shape, an example of such a clip being shown in Figure 9, each spring clip being formed with inwardly directed tangs 12 which when the clip is mounted in position on the flange, as in Figure 10, frictionally engage the flange and thus firmly maintain the clip in position thereon. As shown clearly in Figure 10 the lower edges of the clip provide shoulders, one of which is engaged by the inwardly turned edge 7 of the supporting clip, the spring clips, as in the case of the pre-formed flange in Figure 7 provide a lead to facilitate placing the strip in position.

Figure 11 illustrates an alternative method of manufacture in which the tubular effective part 1 and flange 2 of the strip is attached to the supporting clip 3 by means other than sewing. In this case a third member 13 is provided which is bent up from sheet metal to embrace the opposite edges of the flange 2, the member 13 being riveted as at 14 to the component 3. As is clearly illustrated in Figure 12 the component 13, like the component 3, is also formed with transversely arranged slots to facilitate the strip being bent around curves of small radius.

Referring now to Figure 13, this figure illustrates an arrangement in which the flange is fitted with a strip metal member 15 extending throughout its length which member is spot welded or otherwise secured in position on the flange and provides a shoulder over which the edge 7 of the supporting clip can ride when placing the strip in position. Figure 13 also shows an arrangement in which the rubber component 1 and 2 is cemented to the clip 3 as distinct from being stitched thereto, the same remarks applying to the ornamental fabric strip 4.

Figure 14 illustrates an alternative construction of strip in which the effective portion 1 is moulded from rubber, for example, Sorbo rubber and is of inverted channel shape, the component 1 being moulded around or otherwise secured to the supporting clip 3, the latter being slightly different from the clip hereinbefore illustrated in that it has a downwardly turned edge 16 which enters the part 1 and an inwardly directed curved edge 17 which overrides outwardly pressed tangs 18 of the supporting flange, the tangs being arranged in the opposite way to those shown in Figure 7, but at the same time providing a lead and also a shoulder to facilitate placing the strip in position and maintaining the latter on the flange against accidental displacement.

In Figure 15 the effective portion 1 is of Sorbo rubber and is cemented or otherwise secured to an ornamental part 19 which may, for example, be of similar material having an external ornamental appearance, the part 19 serving to enclose the supporting clip 3 which in this case is somewhat different in cross section from the clip previously described and illustrated. In this arrangement the supporting flange is formed with a pressed out projection 20 or a series of pressed out projections over which a similar pressed out part 21 of the supporting clip 3 is adapted to ride. The part 19 and part 1 are cemented to the clip 3 by means of a suitable adhesive.

In the case of Figure 16 the strip takes the form of a beading or moulding and is indicated generally by reference numeral 22, the member 22 being recessed along its opposite sides to receive two sheets of glass or glazing lights 23 of a greenhouse and provide a good seal to prevent the ingress of moisture and prevent the escape of warm air. The framework for supporting the glazing lights is shown as being built up of two channel shaped members 24 arranged back to back and suitably secured together, but any other suitable construction may be used if desired. The component 22 which is preferably composed of synthetic rubber is moulded around or otherwise secured to an inner supporting clip 3 which may be similar in construction to those hereinbefore described, although as it is not usually necessary for the strip 22 to pass around a curved path the transverse slots 6 of the strip 3 may conveniently be omitted. To effectively secure the supporting clip in position on the flange a series of clips such as are shown in Figure 9 may be applied to the flange, or alternatively the supporting clip 3 may be of resilient construction so that it merely frictionally grips the supporting flange and thus retains its position thereon. Alternatively, the flange 6 may be formed so that the supporting clip 3 has necessarily to override one or more projections on the flange to secure it thereon.

The component 22 is produced with two outwardly directed parts 25 on which the glass sheets 23 will seat and projections 25 engage the adjacent surfaces of the components 24.

Referring now to Figure 17 which illustrates the application of the invention to a carpet sweeper or vacuum cleaner 26 and wherein the two-part casing is formed with parallel projecting flanges 27, the moulding or beading is again produced from rubber or other resilient material, the moulding or beading being indicated by reference numeral 28. In this case the component 28 is of hollow formation to accommodate a supporting clip 3 secured therein in any suitable manner. To attach the component 28 to the domestic article the flange 27 may be fitted with a series of clips such as are shown in Figure 9, or the supporting clip 3 may engage the flange 27 direct, the component 28 in either case providing a buffer which can be arranged to surround or partially surround the domestic article and prevent damage to the furniture occurring when it is in use.

Although in the construction hereinbefore described the effective part of the strip is shown secured to its associated supporting clip by means of sewing, by adhesive or with the aid of a third component arranged to embrace partially the flange of the effective portion, it is within the scope of the invention to employ other methods of securing the components together, such as, for example, extruding or moulding the effective portion 1 including its associated flange 2 of the supporting clip 3, in which case the latter may be either in its flat state or already bent into channel form, the extruded rubber being arranged to flow through holes and/or slots in the component 3 so as to key the effective portion firmly in position upon the supporting clip.

The supporting clip 3 may be modified in various ways and may, for example, have an extension at one edge for the purpose of securing a trimming pad in position.

Furthermore, although it is preferred in the case of the application of the strip to a motor vehicle for the strip to be applied to a flange provided on the vehicle body, it is within the scope of the invention to apply the strip to a flange on the vehicle door or other closure member, the effective portion being in either case compressed to a greater or lesser extent under the closing action of the door or other closure member to provide an efficient seal.

What I claim is:

1. A sealing strip or the like for application to a supporting flange comprising a channel-shaped member having shanks and a bend, said member having longitudinally spaced slots therein extending transversely from an edge at least to the bend, adjacent slots having their mouths at opposite edges of the channel member, an effective portion composed of soft resilient material, means holding said effective portion together with said channel member along one of the shanks of the channel member, one of the shanks of the channel member having inturned edge portions between the slots and extending into the channel space for coaction with the supporting flange.

2. A sealing strip or the like for application to a supporting flange comprising a channel-shaped member having shanks and a bend, said member having longitudinally spaced slots therein extending transversely from an edge through the bend, adjacent slots having their mouths at opposite edges of the channel member, an effective portion composed of soft resilient material, means holding said effective portion together with said channel member along one of the shanks of the channel member, one of the shanks of the channel member having inturned edge portions continuous between the slots and extending into the channel space for coaction with the supporting flange.

3. A sealing strip or the like for application to a supporting flange comprising a channel-shaped member having shanks and a bend, said member having longitudinally spaced slots therein extending transversely from an edge at least to the bend, adjacent slots having their mouths at opposite edges of the channel member, a cover comprising a fabric strip and an effective portion composed of soft resilient material, means securing the edge of the cover to the inner surface of one of the shanks with the cover extending around the edge of the shank and overlying the outer surface of and secured to the channel-shaped member with said effective portion extending along a shank of the channel member, the other of the shanks of the channel member having inturned edge portions between the slots and extending into the channel space for coaction with the supporting flange.

4. A sealing strip or the like comprising a supporting flange having projections thereon spaced inwardly from its edge, a channel-shaped member overlying said flange, said member having shanks and a bend, said member having longitudinally spaced slots therein extending transversely from an edge at least to the bend, adjacent slots having their mouths at opposite edges of the channel member, an effective portion composed of soft resilient material, means holding said effective portion together with said channel member along one of the shanks of the channel member, one of the shanks of the channel member having inturned edge portions between the slots extending into the channel space against the flanges at points more remote from the flange edge than the projections and coaction with the projections of the supporting flange to establish positive interlocking connection with said supporting flanges.

5. A sealing strip as claimed in claim 1 in which the channel-shaped member has therein longitudinally spaced holes and wherein the means holding said effective portion together with said channel member is stitching passing through said holes.

6. A sealing strip as claimed in claim 1 in which the effective portion is comprised of a hollow tube connected to a flange by an integral neck and wherein the flange portion of the effective portion lies along one of the shanks of the channel member.

THOMAS JOHN ROBERT BRIGHT.

REFERENCES CITED

The following references are of record in the file of this patent:

UNITED STATES PATENTS

| Number | Name | Date |
|---|---|---|
| 2,089,085 | Bailey | Aug. 3, 1937 |
| 2,161,648 | Widman | June 6, 1939 |
| 2,169,503 | Schlegel | Aug. 15, 1939 |
| 2,273,684 | Bailey | Feb. 17, 1942 |
| 2,348,319 | Bailey | May 9, 1944 |
| 2,449,000 | Merrill | Sept. 7, 1948 |
| 2,464,406 | Kramer | Mar. 15, 1949 |